Nov. 3, 1925.
J. T. BARTON
1,559,734
FENCE
Filed May 15, 1925
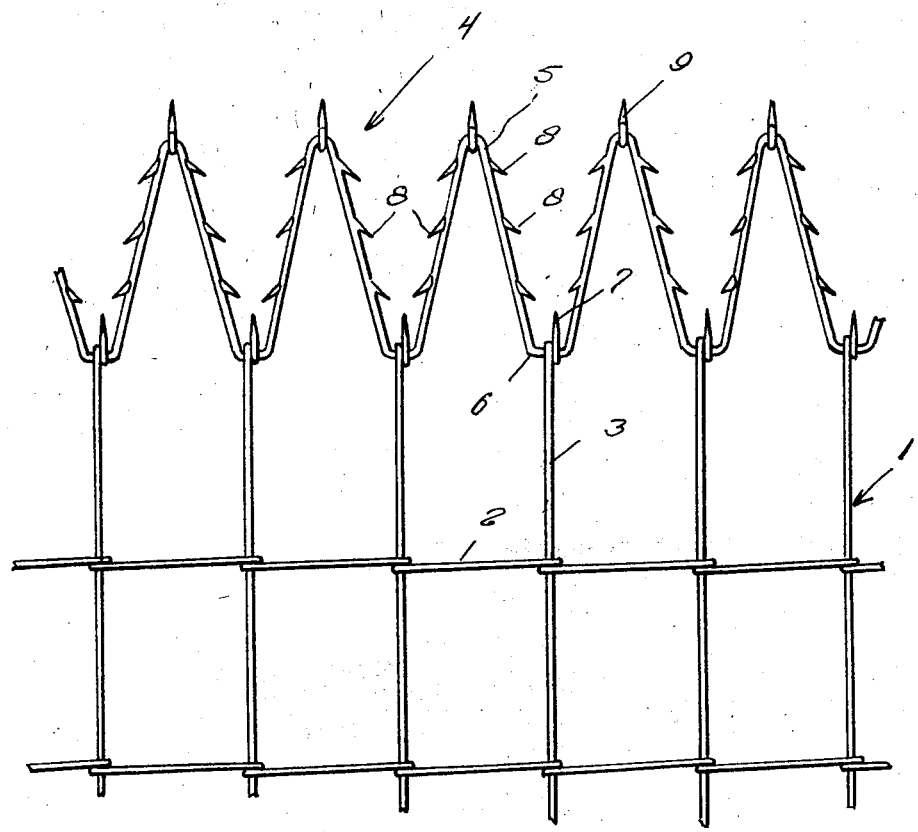
Inventor
J. T. Barton,
Attorney Patented Nov. 3, 1925.

1,559,734

UNITED STATES PATENT OFFICE.

JOHN T. BARTON, OF SAN ANGELO, TEXAS.

FENCE.

Application filed May 15, 1925. Serial No. 30,487.

*To all whom it may concern:*

Be it known that I, JOHN T. BARTON, a citizen of the United States, residing at San Angelo, in the county of Tom Green and State of Texas, have invented certain new and useful Improvements in Fences, of which the following is a specification.

This invention relates to an improved fence, and it has particular reference to means for use in connection with the fence proper to prevent scaling of the fence by animals.

While the invention is not to be restricted, it is especially adapted for use in portions of the land inhabited by wolves and similar animals.

To this end, I provide a guard for disposition on top of the wire fence, this guard serving to prevent a wolf from climbing thereover, and causing him to become entangled and trapped, so that he may be subsequently disposed of.

The particular details forming the improved structure will become apparent from the following description and drawing.

In the accompanying drawing, forming a part of this application:

The single figure represents the side shield of a fragmentary portion of a wire fence, equipped with an animal guard constructed in accordance with the present invention.

Referring to the drawing in detail, the reference character 1 designates, as a whole, the wire fence. This preferably comprises the form of fence made up of horizontal strands 2, wrapped about vertical strands 3. The guard indicated generally at 4 is connected with the upper end of the vertical strands 3. While this guard could be constructed otherwise, it preferably comprises a sturdy wire, which is bent at longitudinally spaced points to provide a plurality of V-shaped portions 5. These V-shaped portions thus define intervening trapping spaces. The connections 6 between the several V-shaped portions are substantially straight and the upper ends of the vertical wire strands 3 of the main fence are wrapped around the straight portions and terminate in pointed ends 7. The divergent portions of the V-shaped parts 5 are all provided with downturned sharpened spurs 8. Also, at the apex of the V-shaped portion is a penetrating point 9. In this connection, it is to be stated that the wire from which the device is formed must be comparatively rigid so that it will not twist or give way from the stresses and weight exerted thereon by the animal in his lunges to escape. Consequently, the device, in addition to acting as a guard to prevent the climbing of animals thereover in a measure affords a trap, which, in a number of instances, serves to hold the animal therein, for quite some time, until he can be disposed of. The animal when once in the pocket provided in the V-shaped portion will find difficulty in escaping, owing to the downwardly directed spurs 8.

It is believed that by considering the description in conjunction with the drawings, a clear comprehension of the invention may be obtained. Therefore, a more lengthy description is probably unnecessary.

While I have shown and described the invention, as used in association with a particular kind of a woven wire fence, and have indicated that it is particularly designed for guarding against the entrance of wolves, I wish it to be understood that the invention is not to be restricted to this particular use, for it may suffice effectively in various other similar capacities.

I claim:

In combination, a fence made up of a plurality of horizontal and vertical interconnected wires, a guard for the top of said fence, said guard being made from a length of wire bent at longitudinal intervals into V-shaped portions and intervening correspondingly shaped pockets, the portions joining the V-shaped portions being substantially straight, the upper ends of the vertical wires of said fence being wrapped around said straight portions and terminating in points, and antiescape means carried by the V-shaped portions of said guard.

In testimony whereof I affix my signature.

JOHN T. BARTON.